(12) United States Patent
Rosenwirth et al.

(10) Patent No.: US 9,138,102 B2
(45) Date of Patent: Sep. 22, 2015

(54) RELEASE SYSTEM FOR KITCHEN UTENSIL

(75) Inventors: Christian Rosenwirth, St. Georgen/Gailtal (AT); Ernst Erich Petzl, Radenthein (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 991 days.

(21) Appl. No.: 13/133,190

(22) PCT Filed: Dec. 2, 2009

(86) PCT No.: PCT/IB2009/055466
§ 371 (c)(1),
(2), (4) Date: Jun. 7, 2011

(87) PCT Pub. No.: WO2010/070513
PCT Pub. Date: Jun. 24, 2010

(65) Prior Publication Data
US 2011/0232505 A1    Sep. 29, 2011

(30) Foreign Application Priority Data

Dec. 18, 2008 (EP) .................................... 08172124

(51) Int. Cl.
*A47J 43/07* (2006.01)
*A47J 43/08* (2006.01)
*A47J 43/044* (2006.01)

(52) U.S. Cl.
CPC ............ *A47J 43/0705* (2013.01); *A47J 43/082* (2013.01); *A47J 2043/04427* (2013.01); *Y10T 29/49826* (2015.01)

(58) Field of Classification Search
USPC ................ 366/129, 342, 343; 99/484; 29/428
See application file for complete search history.

(56) References Cited

U.S. PATENT DOCUMENTS

| 5,567,047 A * | 10/1996 | Fritsch ......................... 366/129 |
| 6,955,117 B2 | 10/2005 | Naud |
| 7,371,003 B2 | 5/2008 | Hamelin |
| 2011/0232505 A1 | 9/2011 | Rosenwirth |

FOREIGN PATENT DOCUMENTS

| EP | 0692215 A1 | 1/1996 |
| EP | 1529473 A1 | 11/2005 |
| EP | 1745728 A1 | 1/2007 |
| FR | 2795938 A | 1/2001 |
| JP | 2003310453 A | 11/2003 |
| JP | 2003532471 A | 11/2003 |
| JP | 2006325920 A | 12/2006 |
| JP | 2007307008 A | 11/2007 |
| WO | 2007007448 A1 | 1/2007 |

* cited by examiner

*Primary Examiner* — James Sanders (57) ABSTRACT

The present invention relates to release system for a kitchen utensil (1) comprising a coupling system (2) for connecting an accessory (3) to a power unit (4) of the kitchen utensil (1). A release mechanism on the coupling system (2) for connecting the accessory (3) comprise one or more locking member(s) (6) and one or more release lever(s). These parts (6) are adapted to move between a locked position and a release position where they slidably connect(s) with one another. Hereby the accessory (3) can be separated from the power unit (4) by only pushing a single release button (5) on the kitchen utensils' (1) power unit (4).

8 Claims, 6 Drawing Sheets

RELEASE SYSTEM FOR KITCHEN UTENSIL

FIELD OF THE INVENTION

The present invention relates to a release system, more specifically the invention relates to a kitchen utensil that when two members sliding against each other, release an accessory from a power unit.

BACKGROUND OF THE INVENTION

Kitchen utensils with exchangeable accessories for different purposes such as whisking, chopping and mixing are well known. Until recently it was normal to push two buttons on a hand blender, when one wanted to remove to accessory and grab and wriggle the accessory in order to remove it from the power unit. With time, the release mechanisms have become more sophisticated. Now only one button, as opposed to two, is required to release the accessory from the power unit. An example of this can be found in U.S. Pat. No. 7,371,003 B2. Here it is described how a coupling piece on the accessory is equipped with notches or recesses that cooperate with latches and tongues carried by the case or power unit. By pressing a button on the case, the latching tongues disengage from the notches and the accessory is uncoupled from the case. This requires that one grab the accessory and removes it from the power unit.

SUMMARY OF THE INVENTION

It would be advantageous to provide a kitchen utensil with a releasing mechanism that is easier to handle than the solutions presently known. It is an object of the present invention to provide a kitchen utensil with an alternative solution to already known release mechanisms. The object is fulfilled by providing a first, a second and a third aspect of the invention. In the first aspect of the invention a kitchen utensil comprising a coupling system for connecting an accessory and a power unit, the coupling system comprising: a release mechanism comprising one or more locking member(s) adapted to move between a locked position and a release position wherein one or more release lever(s) slidably connect(s) with the one or more locking member(s). When the release lever is pressed down, it may be adapted to provide the locking members with a movement in the perpendicular, or essentially perpendicular, direction of the release lever. The power unit is to be construed as any unit providing a mechanical force, preferably a rotational force to the accessory. This mechanical force could be delivered from a kind of motor, such as an electro motor, and the motor could be powered by sun cells, batteries, mains or an accumulator. The coupling system may comprise the means for attaching and ejecting/detaching the accessory. In this application the power unit comprises the coupling system as well.

According to an embodiment of the invention the one or more release lever(s) and/or the one or more locking member(s) may further comprise inclined sliding surfaces, which are inclined in relation to the one or more locking member(s)' direction of movement between the locked position and the release position. The slidability may be obtained through inclined surfaces, e.g. in relation to the direction of movement of the release lever and/or the locking member. But it may also be obtained by providing the locking member with a guide groove, in which the release lever can slide. This provides for an easy locking and unlocking of the kitchen utensil.

According to an embodiment of the invention the one or more locking member(s) and/or release lever(s) may be communicating with one or more attracting/repelling member(s). These attracting/repelling member(s) may be mounted in connection with the locking member. The attracting/repelling member facilitates movements, so the locking member is in e.g. a locked position when it is not in use. A possible release button, mounted on the release lever, or the release lever itself, may furthermore stay in a start or locked position, when it is not in use, when connected to an attracting/repelling member.

According to an embodiment of the invention the coupling system may further comprise one or more attracting/repelling eject member(s) for ejecting the accessory from the power unit. This is advantageous as it is not necessary to further handle, e.g. touch, the accessory when the release button has been pushed, as the accessory is ejected automatically. This is especially practical when working with hot food. Then one wouldn't burn ones fingers on the hot accessory when trying to remove it. The accessory may be provided with recesses, to accommodate the attracting/repelling eject member, when it is in the locked position.

According to an embodiment of the invention the one or more locking member(s) may be adapted to move between a locked position and the release position due to the interaction between the one or more release lever(s), the locking members and the one or more attracting/repelling member(s). This provides for an easy attachment and release of an accessory to the power unit. The attracting/repelling member secures that the locking member and the release lever, or button, return to a locked position when the release lever is not pressed. The interaction between the release lever and the locking member may push the locking member toward the center axis of the kitchen utensil, thus releasing the accessory from the power unit.

According to an embodiment of the invention the one or more locking member(s) may be adapted to move between the locked position and the release position, wherein the movement to the locked position is being facilitated by interaction between the one or more locking member(s) and the one or more attracting/repelling member(s). The attracting/repelling member ensures that the locking member and the release lever, or release button, return to a locked position when the release lever is not pressed.

According to an embodiment of the invention the one or more locking member(s) may be adapted to move between the locked position and the release position, wherein the movement to the release position is being facilitated by interaction between the one or more locking member(s) and the one or more release lever(s). The interaction between the release lever and the locking member may push the locking member toward the center axis of the kitchen utensil thus releasing the accessory from the power unit.

According to an embodiment of the invention the accessory may be selected from a group consisting of a chopping unit, a whisking unit, a grinding unit, a mixing unit and a bar unit or any combination thereof. This is advantageous as the kitchen utensil may be used for many different purposes. Furthermore after it is used, it is only necessary to clean the accessory and not the whole kitchen utensil including the power unit.

According to an embodiment of the invention the one or more locking member(s) may be covering the attachment means, such as screws, that attach the coupling system to the power unit. This is advantageous as no dirt is collected in e.g. the screw holes or the slot of the screw, or in any other attachment area. The kitchen utensil or device is thus dismountable, compared with welded or glued units, which makes it easy for a repairman to access the internal parts. Furthermore by hiding the attachments means, the user probably would not start to dismount the kitchen utensil themselves, thus they wouldn't do something wrong or any irreversible damage to the kitchen utensil.

According to an embodiment of the invention the one or more attracting/repelling member(s) and/or attracting/repelling eject member(s) may be selected from a group consisting of a helical spring, a clam spring, a bow spring, a compound spring, a diaphragm spring, a barrel spring, attracting/repelling rubber and resilient polymer, a magnet or any combination thereof If a magnet is used as the attracting/repelling member(s), its attracting or repelling characteristics may be used, depending on the orientation of the magnetic field and the position where the magnet is mounted and which kind of material the magnet is mounted in the vicinity of If it is situated near another magnet, the repelling or attracting characteristics may be prevailing. If situated near metal, such as iron, its attracting characteristics may be prevailing.

Many different options are available for achieving the attracting and/or repelling feature. This is advantageous as it is possible to choose the most suitable, most accessible and/or cheapest members.

According to an embodiment of the invention the accessory may comprise one or more recess(es), adapted to receive the one or more locking member(s).

The recesses may be placed on the inside of the accessory at the end of where it attaches to the power unit. It may be one recess for one or more locking member(s), e.g. if the recess stretches partly or completely around the internal circumference of the accessory, or it may be individual recesses for the individual locking members. This prevents rotation and movement in one or more directions, thus making the kitchen utensil sturdier. This may also ensure that the accessory only is attachable when a specific recess and a specific locking member are aligned and can connect to one another.

According to the second aspect of the invention a method of assembling a dismountable kitchen utensil is provided. The method may comprise an interface housing and a motor front, the method may comprise: mounting one or more attracting/repelling eject member(s) in the interface housing; mounting one or more release lever(s) in the interface housing; mounting the interface housing on the motor front; mounting one or more attracting/repelling member(s) on the motor front; mounting one or more locking member(s) on the interface housing. The mounting does not necessarily have to be performed in this order, but may be performed in another order. Other ways of assembling the kitchen utensil is also covered by the scope of the claims. The shape and the connection between the different parts, makes it easy to assemble and disassemble the dismountable kitchen utensil. The method may further comprise mounting a release button in the interface housing. An attracting/repelling member may be mounted between release button and the release lever. This secures that the release button return to a start or locked position after being operated.

According to an embodiment of the invention the method may further comprise mounting the motor front onto the interface housing by using attachments means in form of screws. By attaching the motor front onto the interface housing with screws, it is possible to disassemble the two parts again if technical problems should arise. Instead of screws, the mounting could be performed by providing the motor front and the interface housing with threads, and screw the two parts together.

According to the third aspect of the invention there is provided a method comprising ejecting an accessory from a power unit, the accessory comprising one or more locking recess(es) and the power unit comprising one or more locking member(s) the method may comprise: affecting one or more release lever(s) thus moving the one or more locking member(s) from a locked position to a release position, whereby one or more attracting/repelling eject member(s) eject the accessory from the power unit by an expanding motion. The locking members may be placed in the one or more locking recesses, when the locking members are in the locked position. When the locking members are moved to the release position, the locking members may be removed from the locking recesses, so the accessory can be removed from the power unit. An advantage is that no touching of the accessory is required, which is practical when hot or greasy food is prepared.

Any feature of the first aspect may be applied to the second or third aspect and any feature of the second aspect may be applied to the first or third aspect. Any feature of the third aspect may be applied to the first or second aspect.

The kitchen utensil may further be selected from a group consisting of a food processor, a hand blender, a mixer, a coffee grinder or any combination thereof The combination may be obtained through exchangeable accessory parts. Other devices not mentioned here, may also be comprised.

The coupling system is to be construed as the part on the power unit and the part on the accessory that deals with the attachment of the accessory to the power unit. The coupling system may further comprise a coupling in e.g. aluminum where the different whisking, mixing, chopping, bar or grinding units may be connected in order to provide e.g. rotational movement.

The accessory is the unit that may be coupled on to the power unit by means of the coupling system. The power unit or kitchen utensil may comprise a battery pack, a motor such as an electro motor, light indicators showing e.g. battery level and/or speed level, a printed circuit board, on/off button, assembly means, such as screws, glue, springs, support elements, connection means between the different parts etc.

The kitchen utensil may further comprise an attracting/repelling member under the release button to ensure that the button returns to its release position.

The kitchen utensil can also be disassembled, by removing the release button with a screwdriver from the interface housing. The release lever then moves to the top position and disconnects the locking member. The locking member can be removed and subsequently the screws can be removed as well. The interface housing can now be removed from the topside.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

It is noted that the invention relates to all possible combinations of features recited in the claims.

BRIEF DESCRIPTION OF THE DRAWINGS

This and other aspects of the present invention will now be described in more detail, with reference to the appended drawings showing a currently preferred embodiment of the invention.

Like numbers refer to like elements throughout the figures.

DETAILED DESCRIPTION

Figure 1:
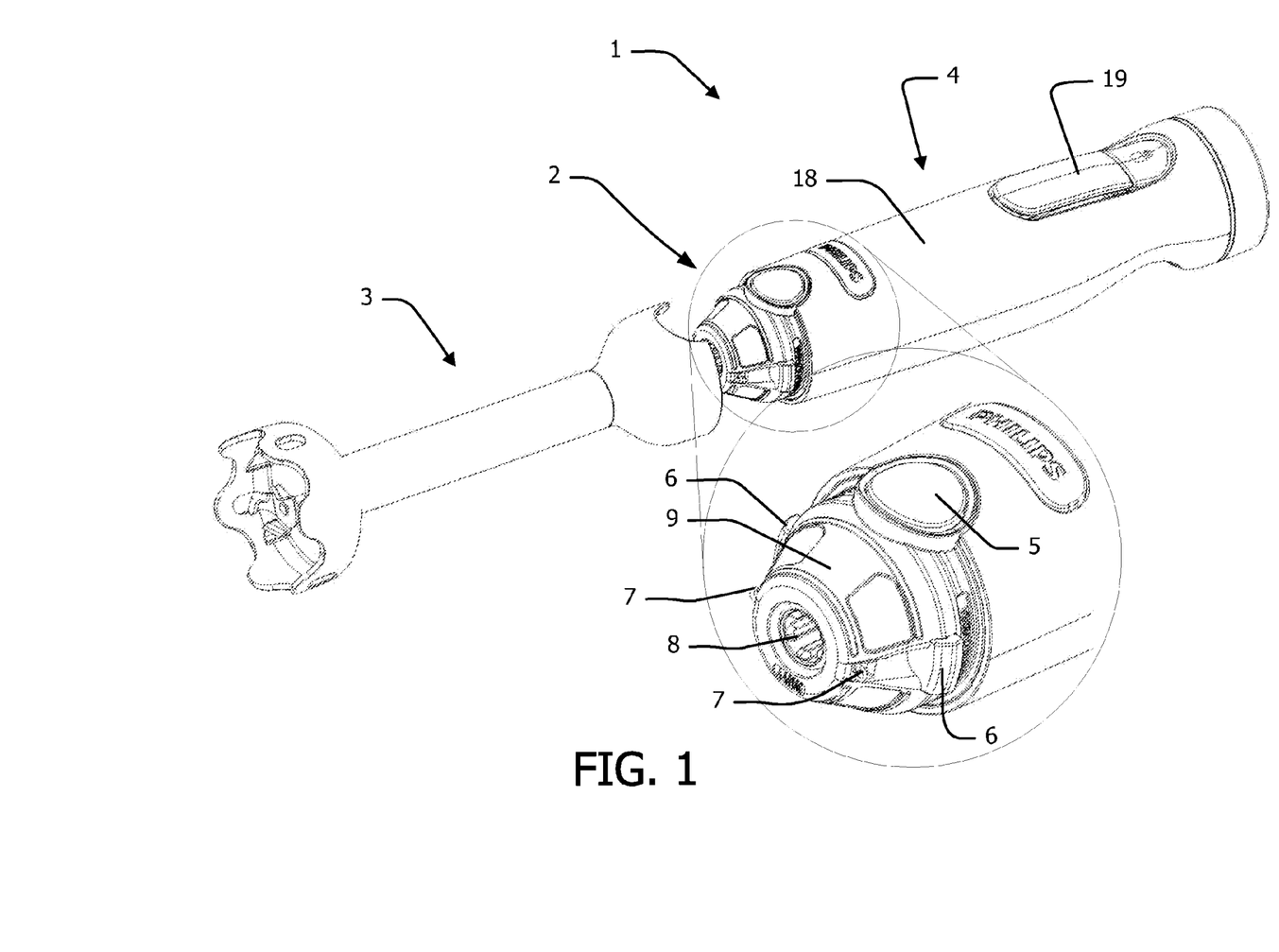
FIG. 1 shows an overview of a kitchen utensil, where the two circles indicate a zoom in on the visible part of the coupling system, when the device is assembled.

FIG. 1. Shows a kitchen utensil 1 in form of a hand blender, comprising an accessory 3, a power unit 4 and a coupling system 2.
The coupling system as seen from the outside further comprises an interface housing 9, locking members 6, attracting/repelling eject member 7, a release button 5, an on/of button 19 and a coupling 8 for attaching the drive shaft (not shown).

Figure 2:
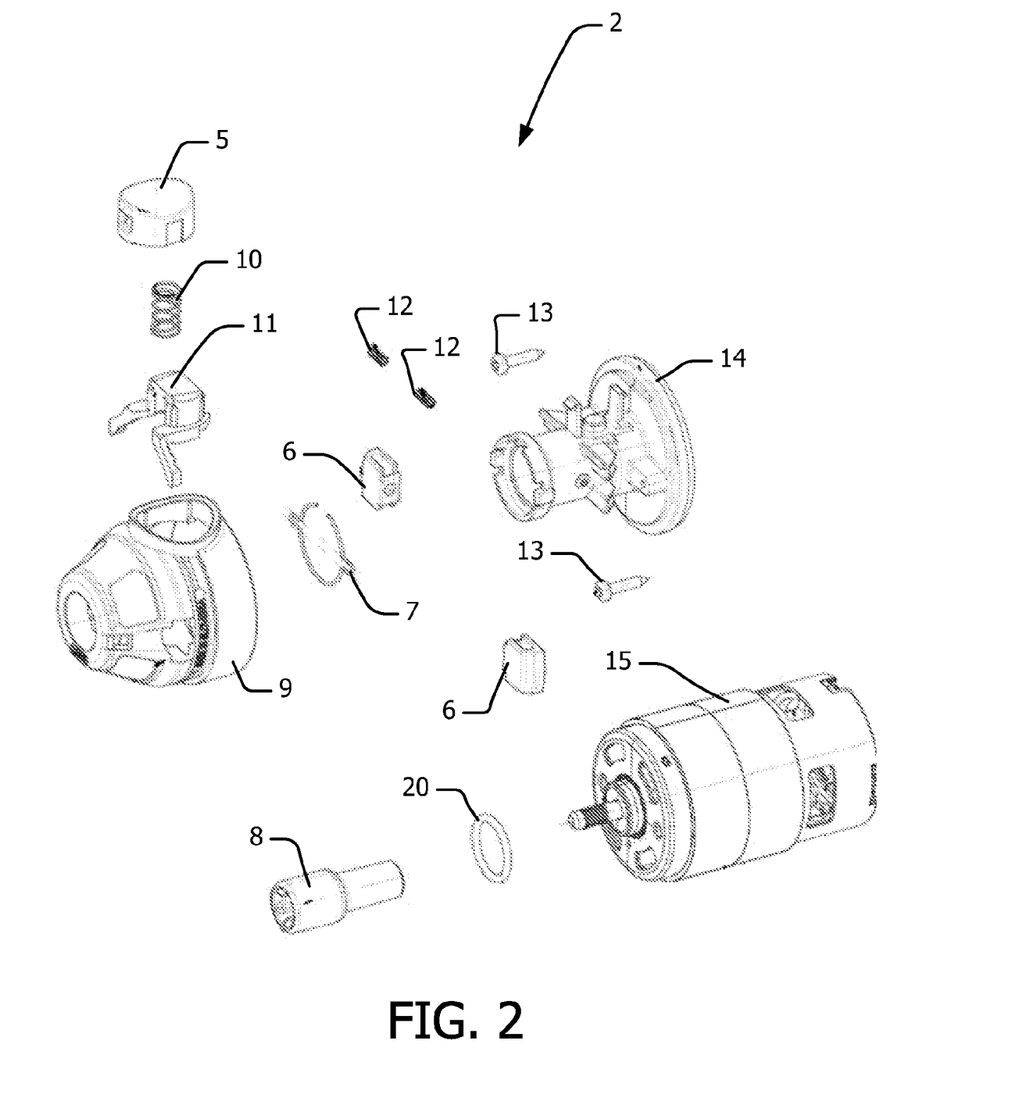
FIG. 2 shows an exploded view of the different parts comprised in an embodiment of the power unit, mainly the coupling system.

FIG. 2 shows an exploded view of the different parts comprised in an embodiment. Here it shows some of the elements inside the power unit 4, mainly in the coupling system 2. The following describes a way of assembling the different parts. The attracting/repelling eject member 7 is mounted into interface housing 9. The release lever 11 is mounted into the interface housing 9. An O-ring 20 may be mounted on the motor 15. The motor front 14 is mounted on the motor 15. The motor front 14 may then be welded to the main housing 18 by ultra sonic welding. On the motor front 14 the attracting/repelling members 12 and 10 are mounted. The release button 5 is then mounted on the attracting/repelling member 10. The coupling 8 is placed in the interface housing 9 before the interface housing 9 is connected to the motor front 14 with two screws 13. The locking members 6 are pushed under the release lever 11 and the release button 5 is pushed up. The release lever 11 is fixed to the interface housing 9 and the locking members 6 cover the screws 13.

Figure 3:
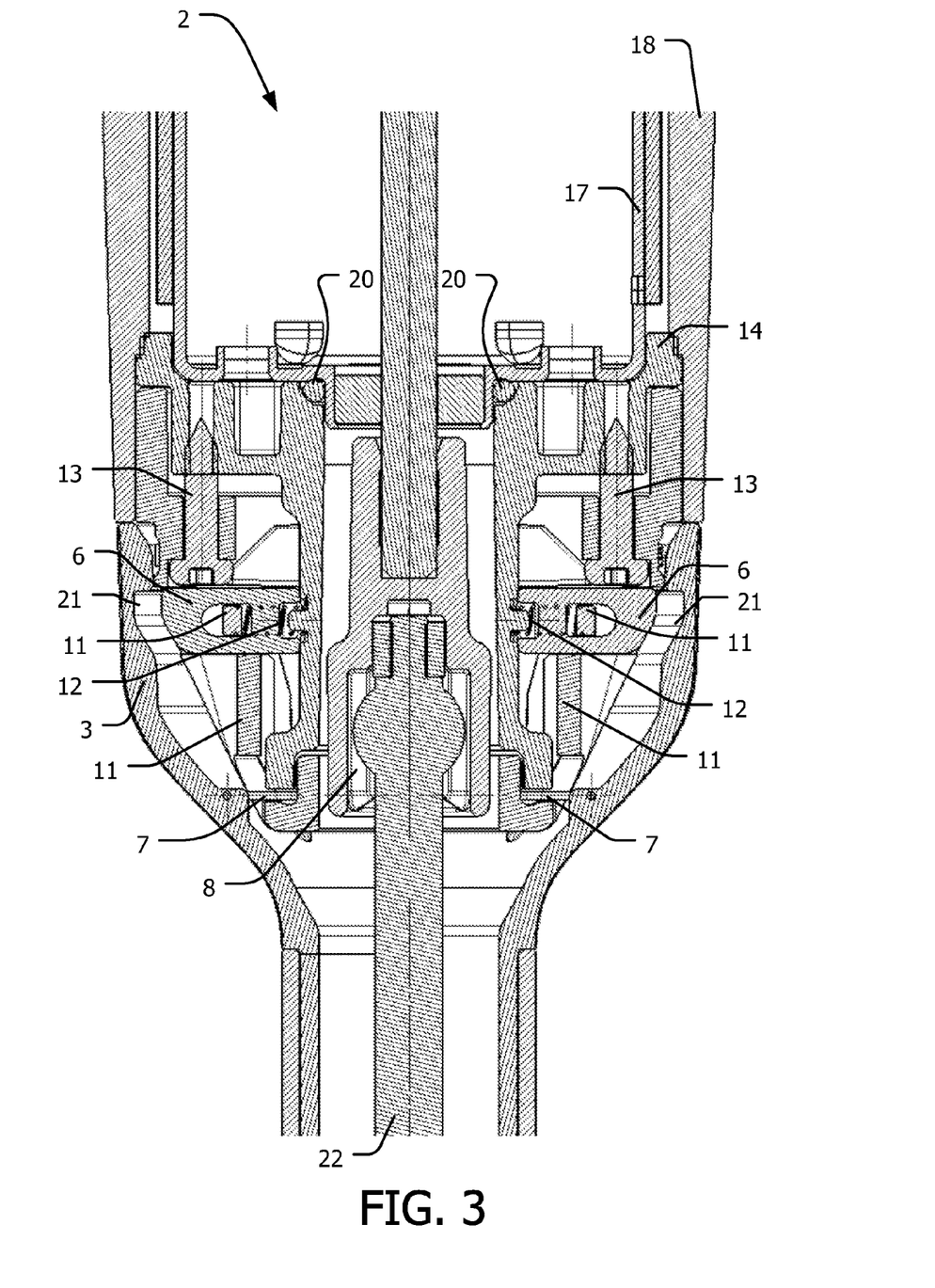
FIGS. 3, 5 and 6 show cross sections of an embodiment where the release button is pressed down, vertically (FIG. 3), horizontally through the locking members (FIG. 5) and horizontally through the release button (FIG. 6) respectively.

FIG. 3. Shows a vertical cross section of the kitchen utensil where the release button 5 is pressed down and the kitchen utensil 1 is in a release position. The accessory 3 is mounted on the interface housing and has not yet been rejected by the attracting/repelling eject member 7. The drive shaft 22 is placed in the coupling 8. The accessory 3 may further be provided with recesses (not shown) on the inside wall, wherein the attracting/repelling eject member 7 may slide. FIG. 3. Further shows how the locking members 6 cover the screws 13. Item 17 is a support unit for the content, such as battery, motor etc. of the power unit. It is shown that when the release levers 11 are pressed, the attracting/repelling member 12 is pushed down. The release levers 11 slide on the locking members 6 and press the locking members 6 inwards, as well as the attracting/repelling members 12. When the release button 5 is released, the attracting/repelling members 10 (not shown) and 12 facilitate the return of the release button 5 and the locking members 6, respectively, to the locked position. The recesses 21 are for accommodating the locking members 6 and for ensuring that the accessory 3 stays fixed to the power unit 4, when the locking members are in the locked position.

Figure 4:
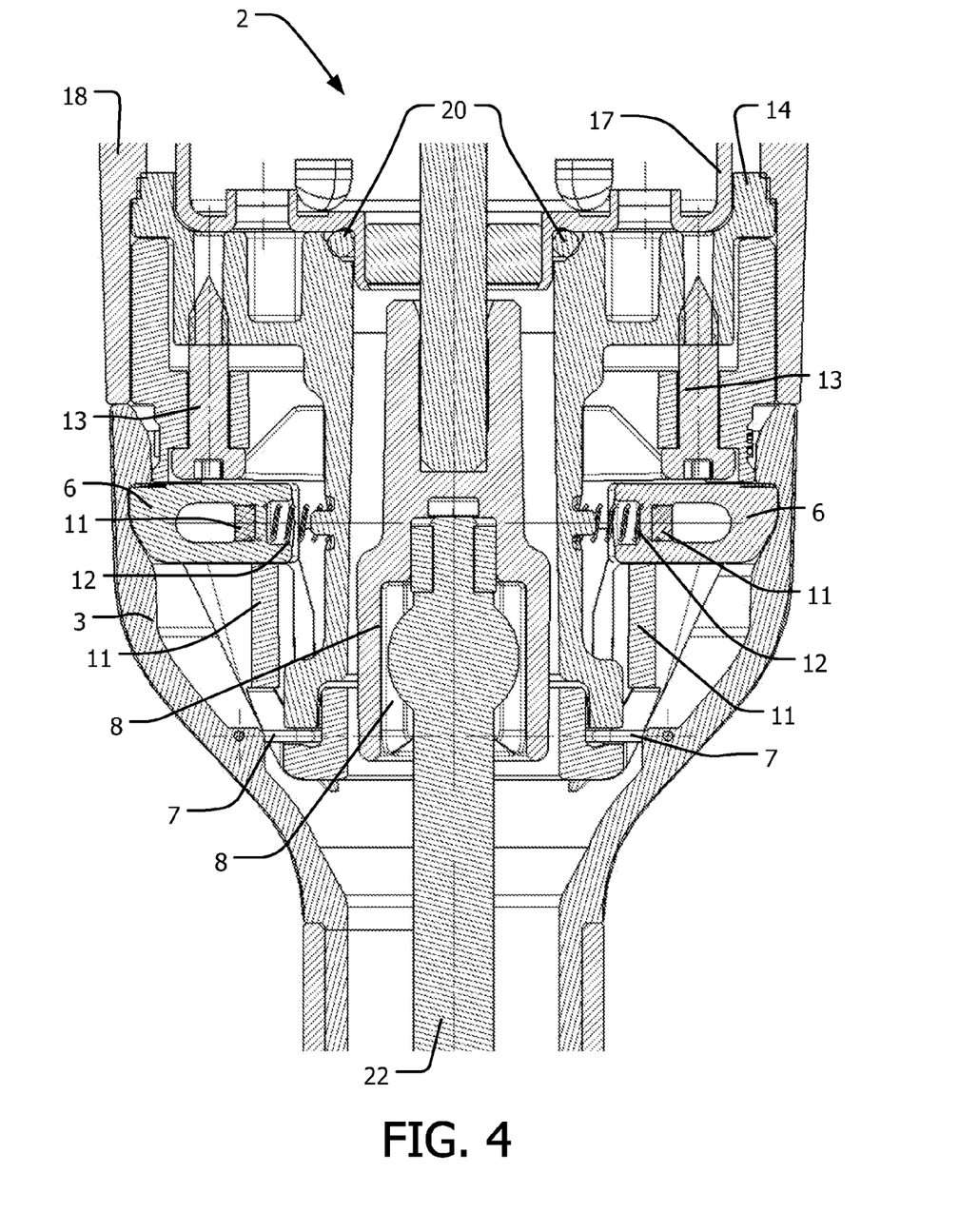
FIGS. 4, 7 and 8 show cross sections of an embodiment where the release button is not pressed, vertically (FIG. 4), horizontally through the locking members (FIG. 7) and horizontally through the release button (FIG. 8) respectively.

FIG. 4. Shows a vertical cross section where the release button 5 is not pressed down and the kitchen utensil 1 is in a locked position. Same features as in FIG. 3 can be seen, but here the attracting/repelling members 12 press the locking members 6 against the interior wall of the accessory 3 so as to maintain the kitchen utensil 1 in a locked position. Thus this is the state where the accessory 3 is fixed to the power unit 4 by means of the coupling system 2, or where no accessory is fixed, e.g. when the kitchen utensil 1 is not in use.

Figure 5:
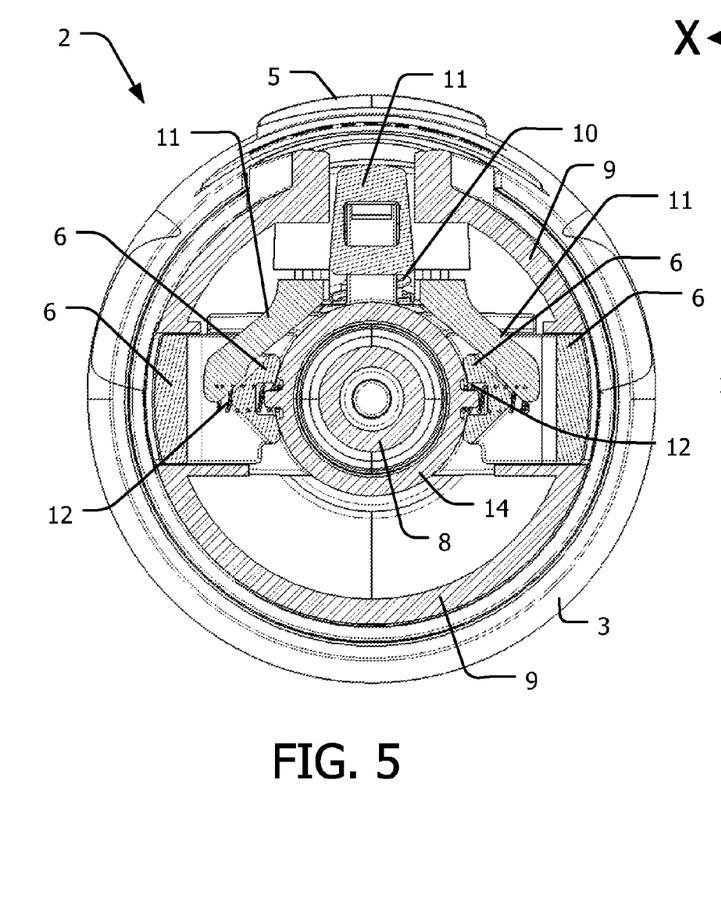

FIG. 5 shows a horizontal cross section through the locking members 6 of the kitchen utensil 1 where the release button 5 is pressed down. When the release button 5 is pressed down, the release levers 11 moves in the Y direction, and during, the brackets of the eject levers moves in the X direction towards the center of the interface housing 9. Then the accessory 3 can then be attached or detached to/from the power unit 4.

Figure 6:
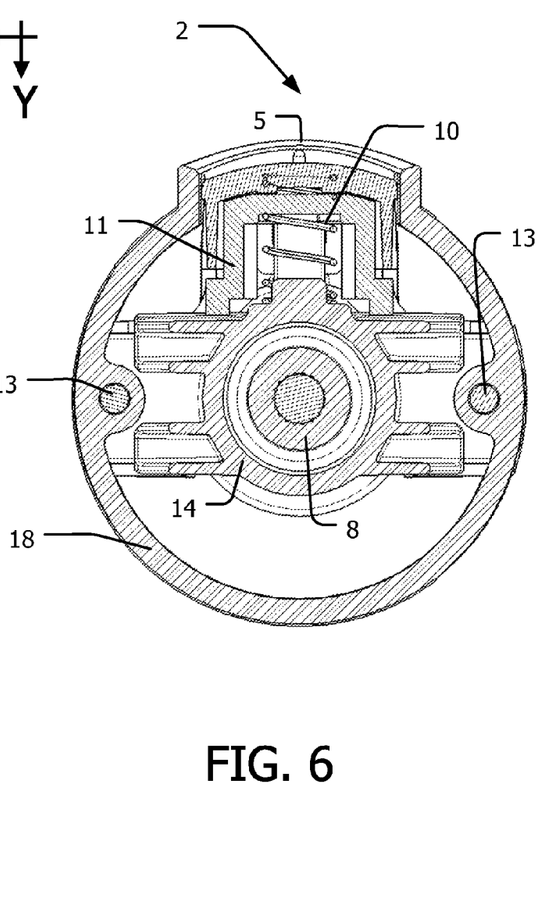

FIG. 6 shows a horizontal cross section through the release button 5 of the kitchen utensil 1 where the release button 5 is pressed down. The view is seen from below. By comparing FIG. 6 and FIG. 8 it is clear how the position of the release button 5 changes, where the release button 5 in FIG. 6 is in its release position, and in FIG. 8 the release button 5 is in its locked position. The attracting/repelling member 10 is pressed down and the locking members 6 are pressed towards the center of the interface housing 9 to facilitate e.g. removal of the accessory.

Figure 7:
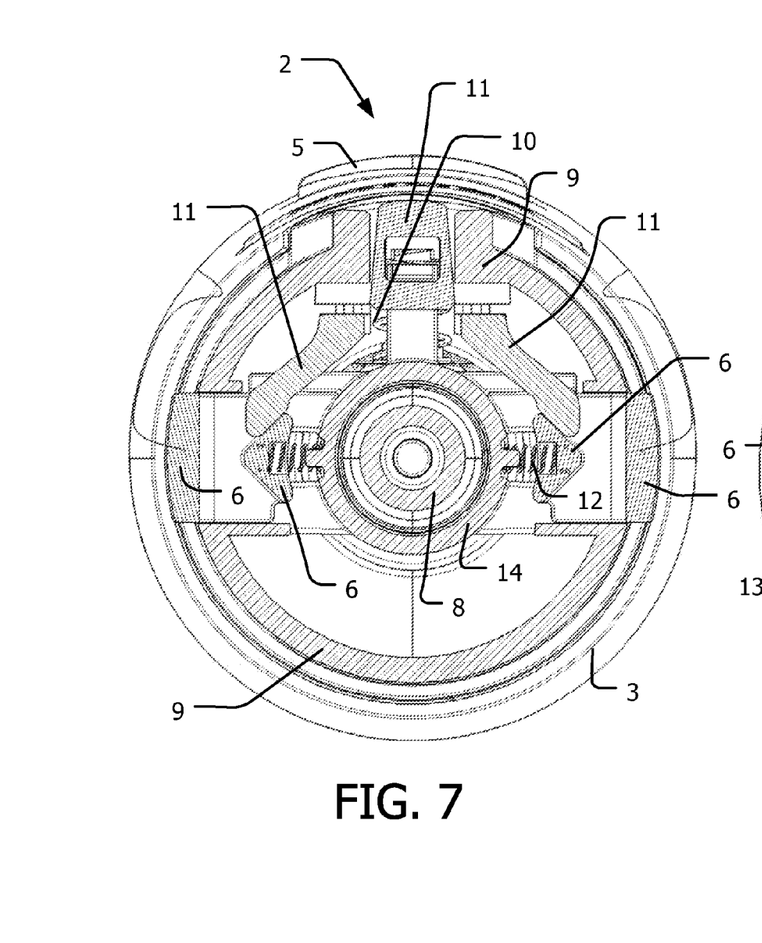

FIG. 7 shows a horizontal cross section through the locking members 6 of the kitchen utensil 1 where the release button 5 is not pressed down. The attracting/repelling member 12 presses the locking members 6 towards the interior wall of the accessory 3.

Figure 8:
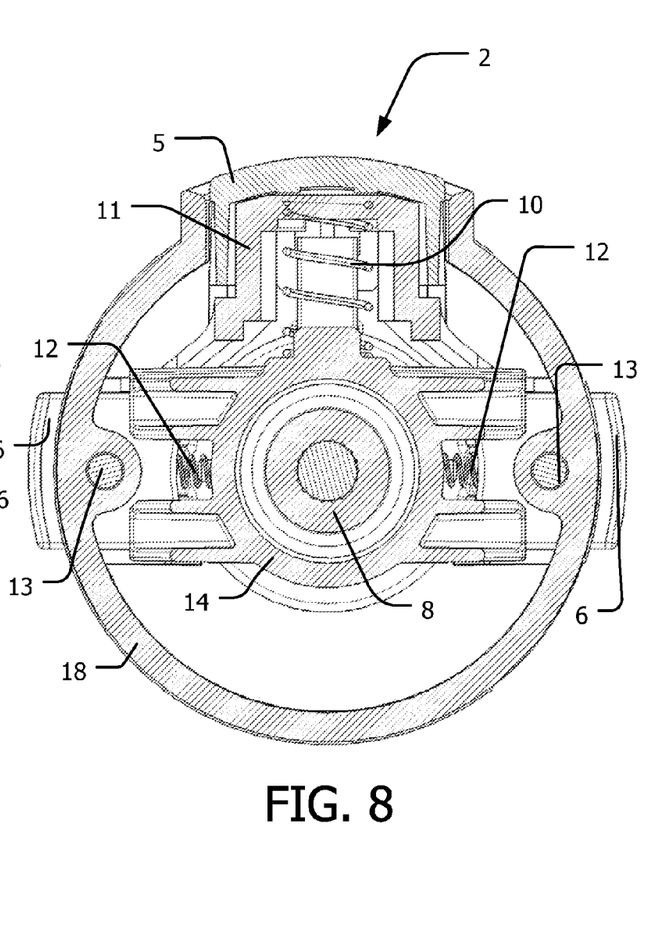

FIG. 8 shows a horizontal cross section through the release button 5 of the kitchen utensil 1 where the release button 5 is not pressed down. The attracting/repelling members 12 here press the locking members 6 outward, i.e. away from the center of the interface housing 9.

All attracting/repelling members 7, 10, 12 in the above embodiments are springs, but other attracting/repelling members such as rubber, magnets or polymer may also be used.

A further embodiment that is not depicted here is similar in function but different in construction. Instead of using two springs or attracting/repelling members for pushing the locking members outwards, a compound spring is provided, where each of its two ends touch the locking members so as to provide a constant pressure to keep the locking members in a locked position. The release levers slide along a recess in the locking member, and when the release button is pressed, the release levers press the locking members and the compound springs inwards, towards the center axis of the kitchen utensil. This makes it possible to detach the accessory. The compound spring is attached on the motor front, e.g. by pushing the spring onto the motor front if e.g. the motor front is equipped with notches and the spring with holes, by gluing it on, or by hot stamping.

The person skilled in the art realizes that the present invention by no means is limited to the preferred embodiments described above. On the contrary, many modifications and variations are possible within the scope of the appended claims.

The invention claimed is:
1. A kitchen utensil comprising a coupling system for connecting an accessory and a power unit, said coupling system comprising:
   an interface housing,
   a single release button,
   at least one spring,
   a release mechanism mounted in the interface housing and comprising one or more locking member(s) adapted to move between a locked position and a release position wherein one or more release lever(s), fixed to the interface housing, slidably connect(s) with the one or more locking member(s), wherein the movement to the release position is being facilitated by interaction between the one or more locking member(s) and the one or more release lever(s), the one or more locking member(s) and the one or more release lever(s) being arranged such that said interaction pushes the locking member(s) toward a center axis of the kitchen utensil thus releasing the accessory from the power unit, and wherein the one or more locking member(s) and/or release lever(s) is/are communicating with one or more springs.

2. The kitchen utensil according to claim 1 wherein the one or more release lever(s) and/or the one or more locking member(s) comprising inclined sliding surfaces, which are inclined in relation to the one or more locking member(s)' direction of movement between the locked position and the release position.

3. The kitchen utensil according to claim 1 wherein the coupling system further comprising one or more attracting/repelling eject member(s) for ejecting the accessory from the power unit.

4. The kitchen utensil according to claim 1 wherein the one or more locking member(s) is/are adapted to move between the locked position and the release position due to the interaction between the one or more release lever(s), the locking members and the one or more springs.

5. The kitchen utensil according to claim 1 wherein the one or more locking member(s) is/are adapted to move between the locked position and the release position, wherein the movement to the locking position is being facilitated by interaction between the one or more locking member(s) and the one or more springs.

6. The kitchen utensil according to claim 1 wherein the one or more locking member(s) is/are covering attachment means that attach the coupling system to the power unit.

7. The kitchen utensil according to claim 1 wherein the one or more springs and/or attracting/repelling eject member(s) is/are selected from a group consisting of a helical spring, a clam spring, a bow spring, a compound spring, a diaphragm spring, a barrel spring, attracting/repelling rubber and resilient polymer, a magnet or any combination thereof.

8. The kitchen utensil according to anyone of claim 1 wherein the accessory comprises one or more recess(es), adapted to receive the one or more locking member(s).

\* \* \* \* \*